(12) United States Patent
Johannesson et al.

(10) Patent No.: US 7,692,700 B2
(45) Date of Patent: Apr. 6, 2010

(54) VIGNETTING COMPENSATION

(75) Inventors: Anders Johannesson, Hollviken (SE); Ingemar Larsson, Malmö (SE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 910 days.

(21) Appl. No.: 10/379,863

(22) Filed: Mar. 4, 2003

(65) Prior Publication Data

US 2004/0155970 A1 Aug. 12, 2004

(51) Int. Cl.
*H04N 9/64* (2006.01)
(52) U.S. Cl. .................... 348/251; 348/188; 348/231.6; 382/274
(58) Field of Classification Search ................. 348/335, 348/188, 187, 272, 280, 263, 251, 362, 231.6, 348/347, 241, 175; 358/523, 274, 518; 382/274
See application file for complete search history.

(56) References Cited

U.S. PATENT DOCUMENTS

| | | | | |
|---|---|---|---|---|
| 5,047,861 A * | 9/1991 | Houchin et al. | ............. | 348/247 |
| 5,181,098 A | 1/1993 | Guerin et al. | ................. | 358/10 |
| 5,434,902 A | 7/1995 | Bruijns | ...................... | 378/98.7 |
| 5,534,916 A | 7/1996 | Sakaguchi | .................. | 348/222 |
| 5,606,392 A * | 2/1997 | Tintera et al. | ............... | 396/161 |
| 5,675,380 A | 10/1997 | Florent et al. | ............... | 348/251 |
| 5,696,850 A * | 12/1997 | Parulski et al. | .............. | 382/261 |
| 5,708,729 A * | 1/1998 | Adams et al. | ............... | 382/169 |
| 5,784,100 A * | 7/1998 | Konishi | ...................... | 348/251 |
| 6,181,830 B1 * | 1/2001 | Sato | ........................... | 382/274 |
| 6,323,934 B1 | 11/2001 | Enomoto | ..................... | 355/40 |
| 6,388,706 B1 | 5/2002 | Takizawa et al. | ............ | 348/273 |
| 6,628,329 B1 * | 9/2003 | Kelly et al. | ................. | 348/252 |
| 7,098,945 B1 * | 8/2006 | Sasai et al. | ............... | 348/223.1 |
| 2002/0057345 A1 | 5/2002 | Tamaki et al. | ............... | 348/207 |
| 2003/0234864 A1 * | 12/2003 | Matherson et al. | .......... | 348/175 |
| 2003/0234866 A1 * | 12/2003 | Cutler | ..................... | 348/207.1 |
| 2003/0234872 A1 * | 12/2003 | Matherson et al. | ....... | 348/222.1 |
| 2007/0211154 A1 * | 9/2007 | Mahmoud et al. | ........... | 348/251 |

FOREIGN PATENT DOCUMENTS

EP    1223750 A2    12/2001
WO    WO01/01675 A2    1/2001

OTHER PUBLICATIONS

"Flash memory." Wikipedia: The Free Encyclopedia. Apr. 27, 2002 <http://en.wikipedia.org/w/index.php?title=Flash_memory &oldid=668715>.*

* cited by examiner

*Primary Examiner*—Lin Ye
*Assistant Examiner*—Chriss S Yoder, III
(74) *Attorney, Agent, or Firm*—Saile Ackerman LLC; Stephen B. Ackerman

(57) ABSTRACT

A method used for the compensation of vignetting in digital cameras has been achieved. The compensation for vignetting is done in two steps. The first step is done during production of the camera unit and involves taking and analyzing an image of a test screen, preferably a gray test screen. This results in a set of e.g. 5×5 coefficients describing a polynomial surface. The second step is done for each image that is taken by the camera and involves calculating and applying a gain-table based on polynomial coefficients to all pixels of the image to compensate vignetting.

20 Claims, 3 Drawing Sheets

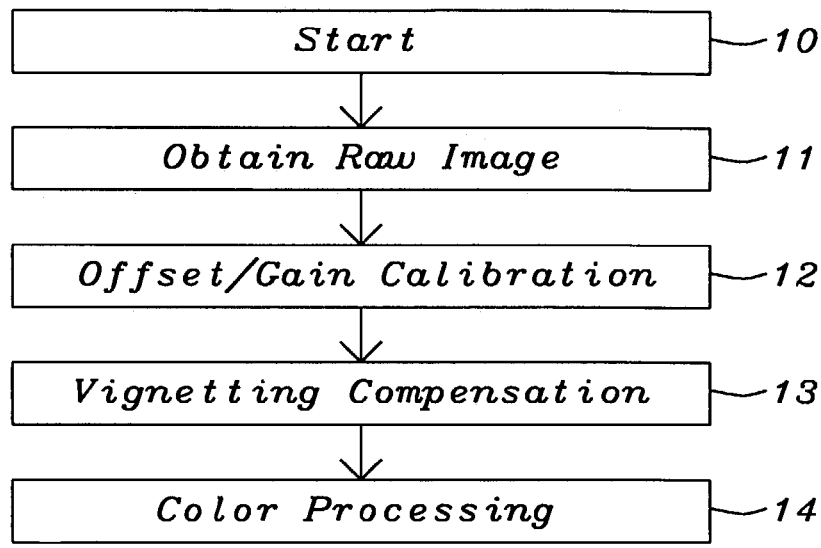
FIG. 1 - Prior Art
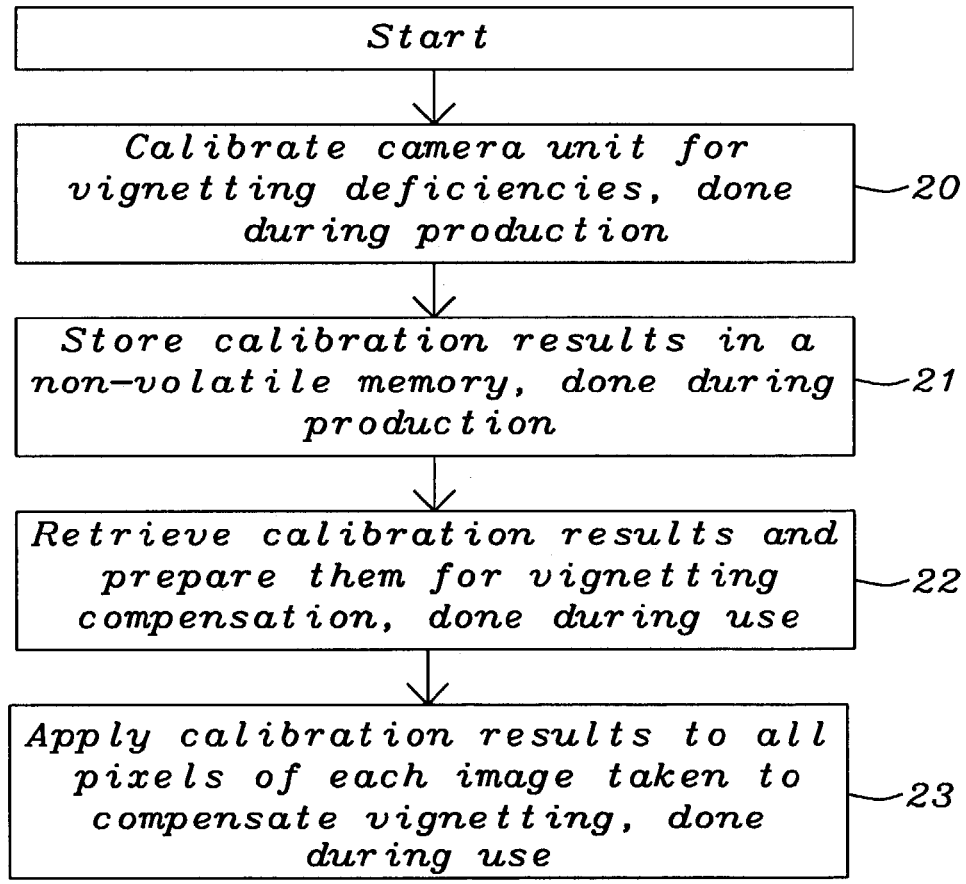
FIG. 2

VIGNETTING COMPENSATION

BACKGROUND OF THE INVENTION (1) Field of the Invention

This invention relates generally to image processing and relates more particularly to a method to compensate vignetting in digital images.

(2) Description of the Prior Art

Photographically, vignetting means the darkening of the corners relative to the centre of an image. All camera lenses suffer, more or less, of these optical phenomena.

FIG. 1 prior art describes some major steps performed in image processing. In the first step 10 a raw image is obtained. In the next step 11 the offset/gain calibration is performed, followed by the compensation for vignetting 12. The last step 13 is the color processing.

A simple lens obeys an optical law called the "cos-$4^{th}$ law" (cosine of the angle of incidence off the lens axis to the $4^{th}$ power. The cos-$4^{th}$ influence comes from a number of factors, including that the light gets spread out over a larger area, and that the corners of the image are further away from the center of the lens than the on-axis part of the image. This means that for a lens with an angle of view of 20 degrees, where the maximum off-axis angle of incidence is 10 degrees, the corners receive cos(10 degrees) to the $4^{th}$ power as much light as the center. Cos (10 degrees) is 0.9848, so to the $4^{th}$ power is 0.9406. Therefore the corners get 94 percent as much light as the center, a generally imperceptible difference. A 20-degree angle of view for a 35 mm camera equates to a 123 mm lens. For a 28 mm lens, with a 75-degree angle of view, cos 4th comes to 0.39. So now the corners only get 39 percent of the light that the center gets. For a 20 mm lens this goes down to 21 percent, and for a 15 mm lens this goes down to 10.5 percent. Obviously the last case is unworkable and is not acceptable.

In order to solve said problems with vignetting, cameras are using typically complex optical systems, which are very expensive to manufacture. It is a challenge for the designers of digital cameras to design a camera having very low vignetting using less expensive lenses.

Solutions dealing with the suppression of vignetting are described in the following patents:

U. S. Pat. No. 6,388,706 to Takizawa et al.) describes an image processing method for an electronic camera which includes a photoelectric element having plural sensors and color filters in plural different colors, wherein each of the plural sensors corresponds to a respective one of the color filters in the different colors. The method includes the steps of: obtaining a signal value from a target sensor; obtaining the first average value from signal values of the sensors; obtaining the second average value from signal values of the sensors and obtaining an interpolation value for a color, which is different from that of the color filter of the target sensor, of the target sensor according to the signal value from the target sensor, the first average value and the second average value. The vignetting of a lens causes a decrease in marginal brightness of an image field. However, if the correction for the decrease in marginal brightness is performed at the same time of performing white balance adjustment or/and gain adjustment, the correction for the marginal brightness may be performed upon decreasing the calculation volume.

(U. S. Pat. No. 6,323,934 to Enomoto) discloses an image processing method in which at least one aberration of an optically recorded image selected from among lateral chromatic aberration, distortion, decrease on the brightness of the edge of image field and image blurring is corrected based on lens characteristics of a taking lens and position information of the image. Additionally, an image processing apparatus comprises an acquiring section for acquiring information identifying a taking lens; a storage section for storing lens characteristics associated with the type of the taking lens; and a correction section which receives the corresponding lens characteristics of the taking lens from the storage section and corrects at least one aberration selected from among lateral chromatic aberration, distortion, vignetting and image blurring. High-quality images that are free from color mismatch, distortion, uneven brightness, blurring and other defects, or both vignetting and distortion can be outputted consistently.

SUMMARY OF THE INVENTION

A principal object of the present invention is to compensate vignetting in digital cameras having inexpensive lenses.

In accordance with the object of this invention a method to compensate vignetting in digital cameras has been achieved. Said method comprises, first, providing a lens system, an array of pixel-based image sensors, a non-volatile memory, a processing device, a RAM, a test chart, and a camera unit. The first steps of said method comprise to calibrate said camera unit for vignetting deficiencies and to store the calibration results in a non-volatile memory. The following steps, performed for each picture taken are to retrieve said calibration results and prepare said data for vignetting compensation and to apply said calibration results to all pixels of each image taken to compensate vignetting.

Also in accordance with the objects of this invention a method to compensate vignetting in digital images has been achieved. Said method comprises, first, providing a non-volatile memory, a lens system, an array of pixel-based sensors, a processing device, a RAM, a test chart, and a camera unit. The first steps comprise, performed once for each camera unit, to take a picture of a test chart, to analyze said test image, to fit said test image with a polynomial surface function, to insert the coefficients of said polynomial function in a matrix and to store said matrix in a non-volatile memory. The following steps, performed for each picture taken, to retrieve said matrix from said non-volatile memory, to construct a polynomial surface function using coefficients retrieved, to build a gain table using said polynomial surface function for all pixels of the image, and to apply values of said gain table to all pixels of the image taken to compensate vignetting.

Also in accordance with the objects of this invention a system to compensate vignetting in digital images has been achieved. Said method comprises, a test chart, a lens system, a pixel-based image sensor array, a non-volatile memory, processing device, and an array of pixel-based image sensors.

BRIEF DESCRIPTION OF THE DRAWINGS

In the accompanying drawings forming a material part of this description, there is shown:

FIG. 1 prior art shows a flowchart of the various steps performed to process images in a digital camera.

FIG. 2 shows a flowchart of the major steps of the method invented to compensate vignetting.

DESCRIPTION OF THE PREFERRED EMBODIMENTS

The preferred embodiments disclose a method to compensate the vignetting of digital cameras allowing the usage of a cheaper lens with high image quality in respect of vignetting.

FIG. 2 describes the general method of a preferred embodiment to compensate vignetting. Said method comprises two phases. In the first phase the camera unit is calibrated. Said calibration is performed only once during production of a camera unit and it comprises two major steps 20 and 21. In step 20 the camera unit is calibrated for vignetting deficiencies and in step 21 the result of said calibration is stored in a non-volatile memory of the camera. The second phase comprises the application of the calibration results to all pixels of each image taken. In step 22 said calibration results are retrieved from said non-volatile memory and prepared to be applied to each image taken. In step 23 said calibration data prepared are applied to all pixels of each image taken to compensate vignetting.

Figure 3:
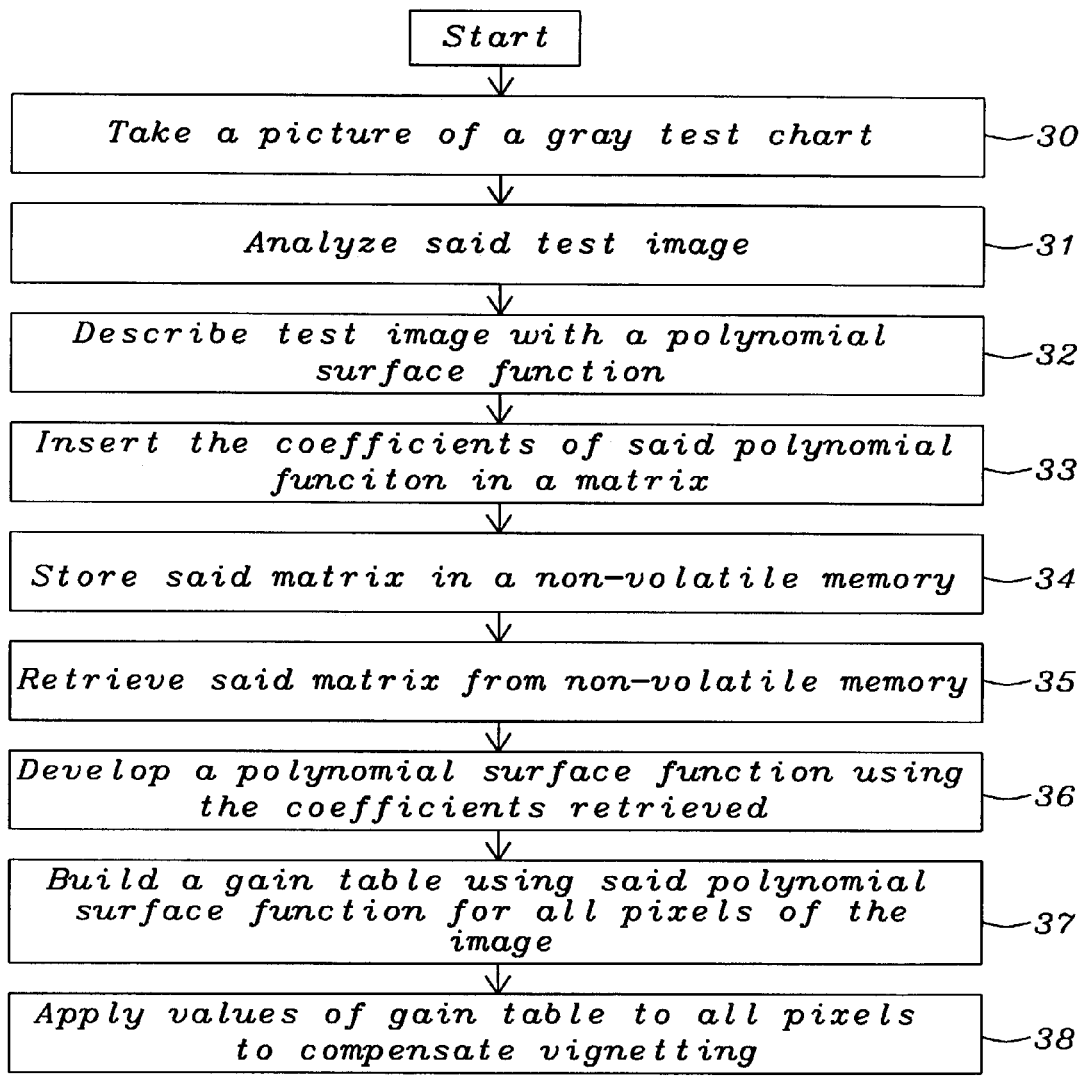
FIG. 3 shows a flowchart of a preferred embodiment of the method invented to compensate vignetting.

FIG. 3 shows in more detail a preferred embodiment of the method invented. Steps 30 to 34 are part of the first phase, the calibration phase. Steps 35 and 38 are part of the second phase, the application phase.

In the first step 30 an image is taken of a test chart, usually a gray screen. In the following step 31 said image is analyzed for any irregularities in respect to vignetting. Step 32 shows that the result of said analysis is described using a polynomial surface function. An example of said polynomial function is the following equation (1):

$$g(x, y) = \sum_{i=0}^{4} \sum_{j=0}^{4} k_{ij} x^i y^j, \quad (1)$$

wherein g (x, y) is the polynomial surface (brightness) at position (x, y), kij are the coefficients of the polynomial surface, (i, j) are indices to k (the matrix of coefficients), and (x, y) are the coordinates of the current pixel. Interpreting vignetting as a gain effect, g (x, y) describes the "vignetting gain" at position (x, y). The factor k can be found for example by a least squares fit to the measured data.

Said polynomial function can be used to create an image showing vignetting only, that is an image bright in the center and darkened away from the center. This image represents the relative gain of the different pixels caused by vignetting.

If said image is divided by the polynomial image pixel-by-pixel, the dark areas away from the center would become as bright as the center. Assuming that the center brightness should remain unaffected, the resulting image should be multiplied by the center brightness of the polynomial image. Therefore the "vignetting gain" g (x, y) can be normalized so that the brightest value of g is 1. This is the same as normalizing the polynomial image with its center (maximum) brightness before the division. The inverse gain image is thus the gain table that the image has to be multiplied with pixel-by pixel in order to compensate vignetting.

In the next step 33 the coefficients of said polynomial surface function are inserted in a matrix, in a preferred embodiment it is a 5×5 matrix. Said matrix can be in principle larger or smaller depending on the degree of the polynomial function selected. In step 34 said matrix of coefficients is stored in a non-volatile memory of the camera unit. Any type of programmable non-volatile memory, like FLASH-memory or EPROM can be used.

The following steps are performed for each image taken and are all part of the second phase of the method invented. In step 35 said matrix of polynomial coefficients is retrieved from said non-volatile memory. In step 36 a polynomial surface function is constructed using the coefficients of said matrix. In step 37 a gain table is built for all pixels of the image taken. In step 38 the values of said gain table is applied to all pixels of the image taken to compensate vignetting:

$$v(x, y) = p(x, y) \times g(x, y), \quad (2)$$

wherein p(x, y) is the raw pixel value and g(x, y) are the values of said gain table.

All vignetting for a fixed iris is modeled by the parameters. It works for both single lenses and lens systems, and also for vignetting due to the depth structure, or the micro lenses of the pixels on the sensor itself, sometimes called pixel vignetting.

Figure 4:
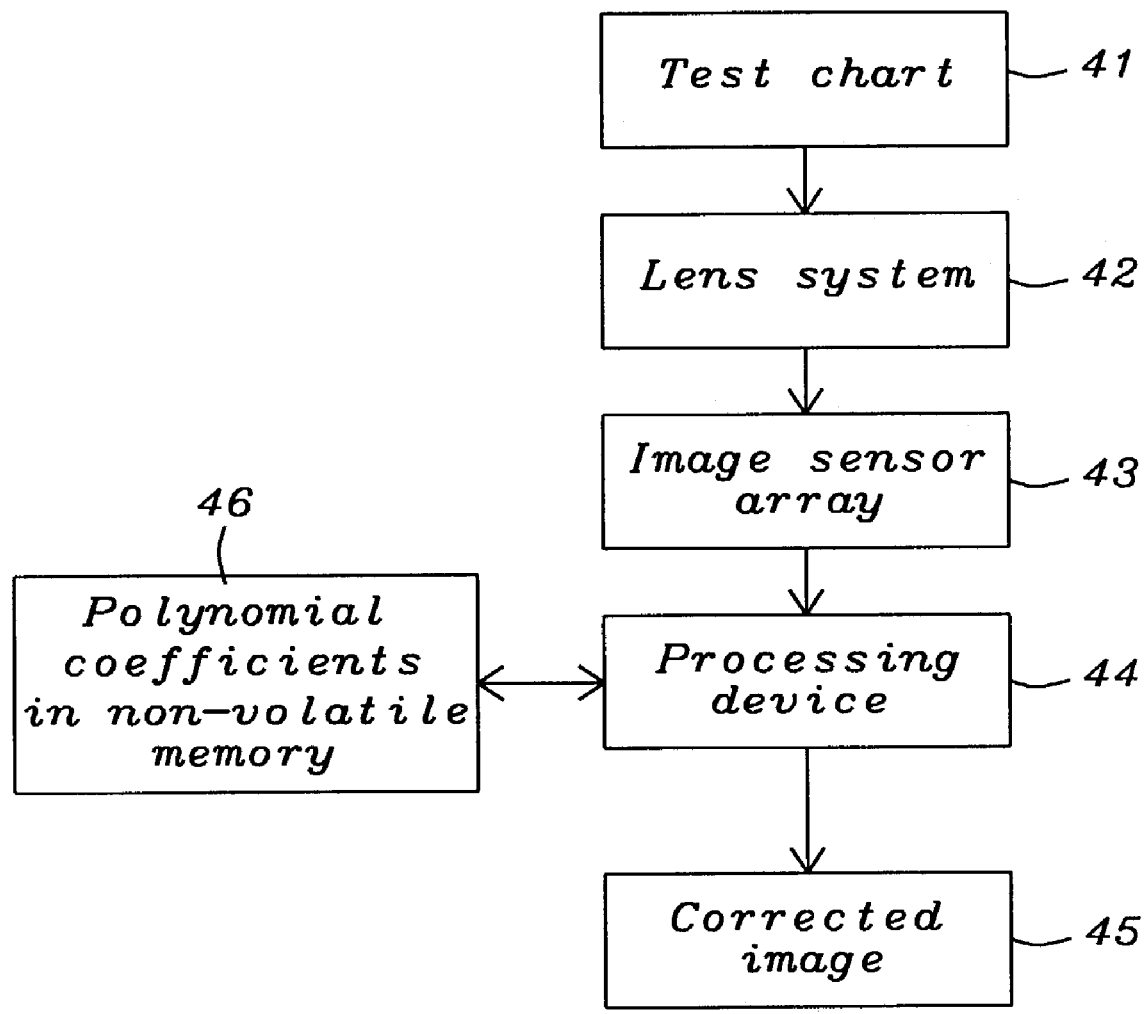
FIG. 4 shows the major components of the system invented.

FIG. 4 describes the basic components of the system invented. Said system comprises a test chart 41, a lens or a lens system 42, an image sensor array 43, a processing device 44 using a non-volatile memory 46 to retrieve the polynomial coefficients to describe vignetting of the lens system. The number 45 represents the corrected image.

It is obvious that a variety of programmable non-volatile memory systems as FLASH-memory, MRAM or EPROM can be used for the system invented. For the image sensors CMOS sensors as well as CCD sensors can be used.

While the invention has been particularly shown and described with reference to the preferred embodiments thereof, it will be understood by those skilled in the art that various changes in form and details may be made without departing from the spirit and scope of the invention.

What is claimed is:

1. A method to compensate vignetting in digital cameras comprising:
   providing a read-Only memory (ROM), a lens system, a processing device, a RAM, a test chart, an array of pixel-based sensors, and a camera unit;
   take a picture of said test chart during production of said camera;
   analyze said test image in regard of brightness of pixels independently of color sensitivity of said pixels during production of said camera;
   fit test image with a polynomial surface function using said brightness during production of said camera;
   insert the coefficients of said polynomial function in a matrix during production of said camera;
   store said matrix in said read-Only memory (ROM) during production of said camera;
   retrieve said matrix from said read-Only memory (ROM);
   construct a polynomial surface function using coefficients retrieved;
   build a gain table using said polynomial surface for all pixels of the image; and
   apply values of said gain table to all pixels of the image taken to compensate vignetting, wherein said compensation of vignetting is performed by multiplying pixel-by-pixel a normalized polynomial function with the raw pixel values of each picture taken.

2. The method of claim 1 wherein said polynomial surface function is following the equation:

$$g(x, y) = \sum_{i=0}^{4} \sum_{j=0}^{4} k_{ij} x^i y^j,$$

wherein g (x, y) is the polynomial surface (brightness) at position (x, y), $k_{ij}$, are the coefficients of the polynomial surface, (i, j) are indices to k (the matrix of coefficients), and (x, y) are the coordinates of the current pixel.

3. The method of claim 2 wherein said factor $k_{i,j}$ is determined by using a least squares fit to the measured data.

4. The method of claim 1 wherein said matrix of polynomial coefficients are derived from a normalized surface function describing the vignetting deficiencies.

5. The method of claim 4 wherein the brightness of the center of the image is used for said normalization.

6. The method of claim 1 wherein said test chart is a gray test chart.

7. The method of claim 1 wherein said non-volatile memory is an EPROM.

8. The method of claim 1 wherein said read-only memory is an EEPROM.

9. The method of claim 1 wherein said matrix is a 5×5 matrix.

10. The method of claim 1 wherein said array of pixel-based sensors are CMOS sensors.

11. The method of claim 1 wherein said array of pixel-based sensors are CCD sensors.

12. A system to compensate vignetting in digital cameras by generating calibration data from color-independent brightness of pixels of an image taken once from a test chart and building gain tables based on said calibration data and applied to compensate vignetting is comprising:
   said test chart;
   a lens system;
   a read-Only memory (ROM) to store coefficients of a polynomial surface describing said color-independent vignetting during production of said camera using said test chart;
   a processing device building said gain tables using said coefficients of a polynomial surface wherein said gain tables are applied to all pixels of the image to compensate vignetting wherein said compensation of vignetting is performed by multiplying pixel-by-pixel a normalized polynomial function with the raw pixel values of each picture taken; and
   an array of pixel-based image sensors.

13. The system of claim 12 wherein said array of image sensors array comprises CMOS image sensors.

14. The system of claim 12 wherein said array of image sensors comprises CCD image sensors.

15. The system of claim 12 wherein said read-only memory is an EPROM.

16. The system of claim 12 wherein said read-only memory is an EEPROM.

17. The system of claim 12 wherein said processing device is a microprocessor.

18. The system of claim 12 wherein said test chart is a grey test chart.

19. The system of claim 12 wherein said lens system comprises one lens.

20. The system of claim 12 wherein said lens system comprises more than one lens.

* * * * *

UNITED STATES PATENT AND TRADEMARK OFFICE
CERTIFICATE OF CORRECTION

| | |
|---|---|
| PATENT NO. | : 7,692,700 B2 |
| APPLICATION NO. | : 10/379863 |
| DATED | : April 6, 2010 |
| INVENTOR(S) | : Anders Johannesson and Ingemar Larsson |

It is certified that error appears in the above-identified patent and that said Letters Patent is hereby corrected as shown below:

On the Title Page in the FOREIGN APPLICATION PRIORITY DATA Item (30) add -- February 12, 2003 (EP) ......................03368014.1 --.

Signed and Sealed this
Thirteenth Day of September, 2011

David J. Kappos
*Director of the United States Patent and Trademark Office*